US008272044B2

(12) United States Patent
Ansari et al.

(10) Patent No.: US 8,272,044 B2
(45) Date of Patent: Sep. 18, 2012

(54) METHOD AND SYSTEM TO MITIGATE LOW RATE DENIAL OF SERVICE (DOS) ATTACKS

(75) Inventors: Nirwan Ansari, Montville, NJ (US); Amey Bhaskar Shevtekar, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1141 days.

(21) Appl. No.: 12/127,246

(22) Filed: May 27, 2008

(65) Prior Publication Data

US 2008/0320585 A1    Dec. 25, 2008

Related U.S. Application Data

(60) Provisional application No. 60/931,862, filed on May 25, 2007, provisional application No. 60/931,848, filed on May 25, 2007.

(51) Int. Cl.
*G06F 17/00* (2006.01)

(52) U.S. Cl. ............... 726/13; 726/11; 726/12; 726/14; 726/16; 726/22; 726/23; 726/24; 726/25; 726/26; 713/153; 713/166; 370/392

(58) Field of Classification Search .................. 726/2–3, 726/11–14, 22–26; 713/155, 166; 370/392
See application file for complete search history.

(56) References Cited

U.S. PATENT DOCUMENTS

| | | | |
|---|---|---|---|
| 6,675,220 B1 * | 1/2004 | Bergamasco et al. | 709/232 |
| 6,888,807 B2 * | 5/2005 | Heller et al. | 370/328 |
| 7,020,783 B2 | 3/2006 | Vange et al. | |
| 7,051,367 B1 | 5/2006 | Krishnaswamy et al. | |
| 7,190,671 B2 | 3/2007 | D'Souza et al. | |
| 7,266,754 B2 | 9/2007 | Shah et al. | |
| 7,295,516 B1 | 11/2007 | Ye | |
| 7,370,357 B2 | 5/2008 | Sekar | |
| 7,603,711 B2 * | 10/2009 | Scheidell | 726/24 |
| 7,624,277 B1 | 11/2009 | Simard et al. | |
| 7,735,116 B1 * | 6/2010 | Gauvin | 726/2 |
| 2003/0161310 A1 * | 8/2003 | Dobbins et al. | 370/392 |
| 2004/0054925 A1 | 3/2004 | Etheridge et al. | |
| 2004/0257999 A1 | 12/2004 | MacIsaac | |
| 2006/0010389 A1 | 1/2006 | Rooney et al. | |
| 2006/0236402 A1 | 10/2006 | Russel et al. | |

OTHER PUBLICATIONS

S. Floyd and V. Jacobson, "Random Early Detection Gateways for Congestion Avoidance", *IEEE/ACM Transactions on Networking*, 1(4), pp. 1-22, 1993.

K. C. Claffy, et al., "A Parameterizable Methodology for Internet Traffic Flow Profiling", *IEEE Journal on Selected Areas in Communication*, 13(8), pp. 1481-1494, 1995.

(Continued)

*Primary Examiner* — Thanhnga B Truong

(57) ABSTRACT

A technique to mitigate low rate Denial-of-Service (DoS) attacks at routers in the Internet is described. In phase 1, necessary flow information from the packets traversing through the router is stored in fast memory; and in phase 2, stored flow information is periodically moved to slow memory from the fast memory for further analysis. The system detects a sudden increase in the traffic load of expired flows within a short period. In a network without low rate DoS attacks, the traffic load of all the expired flows is less than certain thresholds which are derived from real Internet traffic analysis. The system can also include a filtering solution to drop attack packets. The filtering scheme treats the long-lived flows in the Internet preferentially, and drops the attack traffic by monitoring the queue length if the queue length exceeds a threshold percent of the queue limit.

18 Claims, 11 Drawing Sheets

OTHER PUBLICATIONS

M. Delio, "New Breed of Attack Zombies Lurk," URL: http://technews.acm.orglarticles/2001-3/0514m.html#item2, 2001.

R. Mahajan, et al., "Controlling High-Bandwidth Flows at the Congested Router", *IEEE ICNP 2001*, pp. 192-201, 2001.

N. Brownlee and K. Claffy, "Understanding Internet Traffic Streams: Dragonflies and Tortoises", *IEEE Communications Magazine*, 40(10), pp. 110-117, 2002.

A. Belenky and N. Ansari, "On IP Traceback", *IEEE Communications Magazine*, 41(7), pp. 142-153, 2003.

C. Cranor, et al., "Gigascope: A Stream Database for Network Applications", *SIGMOD 2003*, pp. 647-651, 2003.

C. Fraleigh, et al., "Packet-Level Traffic Measurements from the Sprint IP Backbone", *IEEE Network Magazine*, 17(6), pp. 6-16, 2003.

A. Kuzmanovic and E. Knightly, "Low-Rate TCP-Targeted Denial of Service Attacks (The Shrew vs. The Mice and Elephants)", *ACM SIGCOMM 2003*, pp. 75-86, 2003.

J. Cao, et al., "Stochastic Models for Generating Synthetic HTTP Source Traffic", *IEEE Infocom 2004*, pp. 1546-1557, 2004.

H. J. Chao, et al., "CYSEP—a Cyber Security Processor for 10Gbps Networks and Beyond", *IEEE MILCOM 2004*, pp. 1114-1122, 2004.

M. Fomenkov, et al., "Longitudinal study of Internet traffic from 1998-2003", Winter International Symposium on Information and Communication Technologies, pp. 1-6, 2004.

M. Guirguis, et al., "Bandwidth Stealing via Link Targeted RoQ Attacks", *CCN'04*, 2004.

M. Guirguis, et al., "Exploiting the Transients of Adaptation for RoQ Attacks on Internet Resources", *IEEE ICNP 2004*, pp. 184-195, 2004.

A. Kumar, et al., "Data Streaming Algorithms for Efficient and Accurate Estimation of Flow Distribution", *ACM SIGMETRICS 2004*, pp. 177-188, 2004.

A. Kumar, et al., "Space-Code Bloom Filter for Efficient Per-Flow Traffic Measurement", *IEEE Infocom 2004*, pp. 1762-1773, 2004.

S. Kunniyur and R. Srikant, "An Adaptive Virtual Queue (AVQ) Algorithm for Active Queue Management", *IEEE/ACM Transactions on Networking*, 12(2), pp. 286-299, 2004.

J. Mirkovic and P. Reiher, "A Taxonomy of DDoS Attack and DDoS Defense Mechanisms", *ACM SIGCOMM Computer Communications Review*, 34(2), pp. 39-54, 2004.

H. Sun, et al., "Defending Against Low-rate TCP Attack: Dynamic Detection and Protection", *IEEE ICNP 2004*, pp. 196-205, 2004.

G. Yang, et al., "Defense against Low-Rate TCP-targeted Denial-of-Service Attacks", *IEEE Symposium on Computers and Communications*, pp. 345-350, 2004.

F. Yu, et al., "Gigabit Rate Packet Pattern-Matching using TCAM", *IEEE ICNP 2004*, pp. 174-183, 2004.

"2005 Latinode Customer Case Study", URL: http://www.nextone.com/filesILatiNode%20Case%20Study.pdf, 2005.

R. Beverly and S. Bauer, "The Spoofer Project: Inferring the Extent of Source Address Filtering on the Internet", *USENIX STRUTI'05*, pp. 53-59, 2005.

S. Ebrahimi-Taghizadeh, et al., "TCP vs. TCP: A Systematic Study of Adverse Impact of Short-lived TCP Flows on Long-Lived TCP Flows", *IEEE INFOCOM 2005*, pp. 926-937, 2005.

Z. Gao and N. Ansari, "Tracing Cyber Attacks from the Practical Perspective", *IEEE Communications Magazine*, 43(5), pp. 123-131, 2005.

B. Grot and W. Mangione-Smith, "Good Memories: Enhancing Memory Performance for Precise Flow Tracking", *Anchor 05*, 2005.

Y. Kwok, et al., "HAWK: Halting Anomalies with Weighted Choking to Rescue Well-Behaved TCP Sessions from Shrew DDoS Attacks", *ICCNMC*, 2005.

X. Luo and R. K. C. Chang, "On a New Class of Pulsing Denial-of-Service Attacks and the Defense", *NDSS*, 2005.

S. Sarat and A. Terzis, "On the Effect of Router Buffer Sizes on Low-Rate Denial of Service Attacks", *IEEE ICCCN 05*, pp. 281-286, 2005.

A. Shevtekar, et al., "Low Rate TCP Denial-of-Service Attack Detection at Edge Routers", *IEEE Communication Letters*, pp. 363-365, 9(4), 2005.

Y. Xu and R. Guerin, "On the Robustness of Router-based Denial-of-Service (DoS) Defense Systems", *ACM Computer Communications Review*, 35(3), pp. 47-60, 2005.

"2006 CSI/FBI Computer Crime and Security Survey", URL: http://www.gocsi.com/, 2006.

Y. Chen and K. Hwang, "Collaborative Detection and Filtering of Shrew DDoS Attacks Using Spectral Analysis, Journal of Parallel and Distributed Computing, Special Issue on Security in Grids and Distributed Systems", 66(9), 2006.

R. Chertov, et al. "Emulation versus Simulation: A Case Study of TCP-Targeted Denial of Service Attacks", *TridentCom 2006*, pp. 316-325, 2006.

D. Dagon, et al., "Modeling Botnet Propoagation Using Time Zones", *2006 NDSS*, 2006.

A. Kumar and J. Xu, "Sketch Guided Sampling—Using On-Line Estimates of Flow Size for Adaptive Data Collection", *2006 IEEE Infocom*, 2006.

A. Shevtekar and N. Ansari, "Do Low Rate DoS Attacks Affect QoS Sensitive VoIP Traffic?", *IEEE ICC 2006*, pp. 2153-2158, 2006.

Y. Xu and R. Guerin, "A Double Horizon Defense for Robust Regulation of Malicious Traffic", *2006 SecureComm*, 2006.

P. Manolios, "Bloom Filter Calculator", URL: http://www-static.cc.gatech.edu/~manolios/bloom-filters/calculator.html, May 2008.

"PackMime Traffic Generator", URL: http://dirt.cs.unc.edu/packmime, May 2008.

"UCB/LBNL/VINT Network Simulator", URL: http://www.isi.edu/nsman/ns/, May 2008.

The CoralReef Software, URL: http://www.caida.org/tools/measurement/coralreef/, May 2008.

The OC48 Data, URL: http://www.caida.org/data/passive/index.xml#oc48, May 2008.

International Search Report and Written Opinion for PCT/US2008/064913 mailed Oct. 24, 2008.

International Search Report and Written Opinion for PCT/US2008/064900 mailed Oct. 24, 2008.

International Preliminary Report on Patentability for PCT/US2008/064900, mailed Dec. 10, 2009.

International Preliminary Report on Patentability for PCT/US2008/064913, mailed Dec. 10, 2009.

Non-Final Office Action on U.S. Appl. No. 12/127,235, mailed Mar. 2, 2012.

Final Office Action on U.S. Appl. No. 12/127,235, mailed Jul. 20, 2012.

\* cited by examiner

1) If the Virtual Queue > AVQ AQM threshold. Start the detection algorithm.
2) For every packet, update the flow size estimation module.
3) If attack filtering ON, check if the packet belongs to a flow in the benign flow table.
4) If yes, send the packet directly to the queue and continue normal operation.
   If no, send the packet to the attack filtering module.
5) Periodically, flush the contents of the flow size estimation module in the fast memory to the persistent storage in slow memory.
6) In the persistent storage, update existing flows and add new flows. Run the attack detection algorithm and start the attack filtering algorithm if attack is detected.

Fig. 3

1) For all the *expired* flows with *k* packets in each flow in the persistent storage with C as link capacity and P as minimum packet size, IF {0< k < C/P, createdtime > current time – 1sec, lastaccessedtime < current time}, SUM = SUM + Totbytecnt/flow.

2) If SUM > THRESHOLD {Low Rate DoS Attack Detected}

K < 5

Total Capacity (Bytes)

METHOD AND SYSTEM TO MITIGATE LOW RATE DENIAL OF SERVICE (DOS) ATTACKS

CROSS REFERENCE TO RELATED APPLICATIONS

This application claims the benefit of U.S. Provisional Application No. 60/931,848 entitled "Novel Proactive Test Based Differentiation Method And Technique To Mitigate Low Rate DoS Attacks" filed May 25, 2007, and U.S. Provisional Application 60/931,862 entitled "Novel Scalable Method and Technique to Mitigate Low Rate DoS Attacks" filed May 25, 2007, the contents of which are herein incorporated in their entirety.

FIELD

The present disclosure relates to the field of packet network security. More particularly, it relates to the detection and mitigation of Denial of Service (DoS) attacks, Distributed Denial of Service (DDoS) attacks, and Reduction of Quality (RoQ) attacks on packet networks using one or more protocols from the Internet Protocol suite. More specifically the present disclosure describes a method including, but not limited to: a) detecting DoS and/or DDoS and/or RoQ attacks, b) initiating a filtering system in response to the attack, c) mitigating the attack by filtering out attack packets so that normal communication can continue, and d) efficiently implementing the detection and filtering method in hardware and software. The method offers the significant advantages of detecting low rate DoS and/or low rate DDoS attacks and/or RoQ attacks. Additionally, the detection method can operate efficiently and cost effectively at high traffic rates and speeds. Also, the detection and filtering methods are applicable whether or not the attack uses Internet Protocol address spoofing (source and/or destination).

The disclosure relates to the defense against low rate denial of service attacks, which are a type of denial of service attacks in the Internet. It provides an effective method to detect and filter attack traffic.

BACKGROUND

Denial of Service (DoS) attacks impose serious threats to the Internet, resulting in tremendous impact on our daily lives as they become increasingly dependent on the good health of the Internet. Presently, attackers are professionals who are involved in such activities because of financial incentives. Attack strategies and techniques are getting more sophisticated, and can evade conventional detection and defense. A low rate DoS attack is one example of this new breed of sophisticated attack to the Internet.

The concern over low rate DoS attack is commonly known. The 2006 CSI/FBI Computer Crime and Security Survey showed that denial of service (DoS) attacks are still an issue leading to a significant revenue loss for many organizations. The low rate DoS attack poses a new threat to the Internet including occurrences of these attacks on the Internet2 experimental network. Low rate DoS attacks first became publicly known in Kuzmanovic and Knightly, Low-Rate TCP-Targeted Denial of Service Attacks (The Shrew vs. the Mice and Elephants), ACM SIGCOMM 2003, 2003, pp. 75-86, but there has been no widely known solution or fix for them. It is also hard to defend against low rate DoS attacks as the current Internet lacks measures to detect and mitigate them automatically. The Reduction of Quality (RoQ) attack, or a low rate DoS attack that uses IP address spoofing, in particular does not try to shut down the legitimate flows, but tries to reduce the quality of service experienced by them. These attacks can evade detection because of their low average rates, i.e., the average amount of traffic required to stage such an attack is low. Adaptive queue management schemes like RED (random early detection) detect anomalous behavior based on the average queue lengths at the routers, and are therefore easily fooled by low rate DoS attacks. Thus, it is even harder to defend against RoQ attacks. All these low rate types of DoS attacks can be defined by a general periodic waveform as shown in FIG. 1. They are characterized by three parameters, the attack period (T), the burst period or the burst length (t), and the burst rate (R).

Low rate TCP DoS attacks exploit the minimum RTO (retransmission timeout) property of the TCP protocol. The following characterize a low rate TCP DoS attack:

It sends periodic bursts of packets at one-second intervals.
The burst rate is equal to or greater than the bottleneck capacity.
The burst period is tuned to be equal to the round-trip times of the TCP connections. The burst period determines whether the attack causes DoS to the TCP connections with small or long round trip times.
The exponential back off algorithm of the TCP's retransmission mechanism is eventually exploited.

The RoQ (Reduction of Quality) attack targets to dampen QoS (Quality of Service) experienced by the TCP traffic by keeping the time period high. It tries to occupy the share of the legitimate network traffic by sending high rate bursts on longer timescales. The attacker can also keep the burst rate low to exacerbate the attack potency. For instance, by sending the periodic bursts of attack packets to a router, the attacker does not allow the queue to stabilize such that the QoS sensitive Internet traffic experiences degradation of quality. In particular, the periodicity is not well-defined in an RoQ attack, thereby allowing the attacker to keep the average rate of the attack traffic significantly low to evade the adaptive queue management techniques such as RED and RED-PD (random early detection packet drop). To distinguish the two attacks, an attack with time period less than or equal to one second is classified as a low rate DoS attack, while an RoQ attack is one with time period greater than one second. An RoQ attack is defined as an attack whose only objective is to reduce the quality of service received by an application. It may not cause denial of service, which is not its goal, but leads to reduction in quality of service. Note that the reduction of quality should be determined on a quality scale, which will be different for different applications. For simplicity, hereafter the term "low rate DoS attack" refers to both the low rate TCP DoS and RoQ attack, unless otherwise stated.

In previous detection systems, the detection system can detect the stealthy low rate TCP DoS attack by using a simple time difference method. The time difference technique uses a per-flow approach to store arrival times of the packets belonging to each flow, and computes inter-arrival times between the consecutive packets to detect periodicity. The attacker using IP address spoofing can easily deceive this simple per-flow approach as the time difference approach is not be able to detect periodicity in the attack flow, which is no longer a single flow. An attacker uses the IP address spoofing to fool the per flow detection system. Traditional approaches to mitigate the IP address spoofing such as IP traceback are useful when an end-host is attacked. However, the low rate DoS attack targets network elements, and so packets may not even reach the end host. The prior art has not addressed whether an individual router can detect spoofed packets used in a low rate DoS attack, and alleviate/mitigate both the spoofing and the low rate DoS attack. One embodiment described in the present application provides both detection and mitigation against the low rate DoS attacks. The detection part is memory intensive, and thus there is a scalable technique that passively detects the low rate DoS attack by using an algorithm, which works on the persistent memory. After having confirmed the onset of an attack, the filtering algorithm is enabled to separate long-lived legitimate flows at the router from attack flows, and subsequently drop these attack packets.

The MIT Spoofer project described in R. Beverly, S. Bauer, The Spoofer Project: Inferring the Extent of Source Address Filtering on the Internet, in: USENIX SRUTI'05, 2005, pp. 53-59, has reemphasized the detrimental effect of the IP address spoofing. Subnet IP address spoofing is easily orchestrated, as the ingress IP address filtering cannot contain the spoofing. To illustrate the subnet IP address spoofing, consider an attacker in the subnet, 12.28.34.0 to 12.28.34.100; an attacker can easily use any address in this range for spoofing a source IP address inside this subnet. The IP address of every outgoing packet can be spoofed by randomly selecting an IP address from the pool of IP addresses available for spoofing; this is referred to as random IP address spoofing. It is assumed that the attacker has complete control of the source machine and can change the operating system stack as needed. The attacker can use either the UDP or the TCP protocol to send a packet with any possible value in the packet header. The flow-id or a flow is defined by the combination of a source IP address, a destination IP address, a source port, and a destination port. The open knowledge of the RoQ attack and the ON-OFF periodic blasting attack shows that periodicity can be random for the low rate DoS attack. As described in Y. Xu, R. Guerin, On the Robustness of Router-based Denial-of-Service (DoS) Defense Systems, ACM Computer Communications Review. 35(3) 2005 47-60, the attacker has one IP address for every ON period; this is referred to as continuous cycle IP address spoofing. In this type of the attack, one flow consumes excessive bandwidth in order to exceed capacity of the bottleneck link in a short period of time (10-400 millisecond).

Considering the widespread use of botnets by attackers, it is not difficult for an attacker to use compromised machines with valid IP addresses to launch a low rate DoS attack. In addition, the master who controls botnets can sabotage machines in subnets scattered across the Internet. This causes the attack traffic rate coming out of each subnet to be not anomalous, however the aggregated traffic leads to DoS when it reaches the targeted router. Use of botnets also allows an attacker to use compromised machines to send attack traffic like random and continuous cycle IP address spoofing. In a low rate DoS attack, the required number of compromised machines is very low as compared to a traditional DDoS attack. In contrast, in a DDoS attack, the constant flooding of the link makes attack packets easily distinguishable. At least one feature not shown in the prior art is a system to mitigate low rate DoS attacks with IP address spoofing in which an attacker can employ different types of IP address spoofing strategies while launching a low rate DoS attack.

SUMMARY

Briefly, in accordance with at least one embodiment, a methodology is described that provides low rate DoS attack detection mitigation. It is a method which provides a scalable and memory-efficient technique, which would detect the attack traffic at high-speed routers and then drop the attack traffic.

Another embodiment includes a scalable technique to mitigate the stealthy low rate Denial-of-Service (DoS) attacks at the routers in the Internet. In this embodiment, the detection system operates in two phases: in phase 1, the necessary flow information from the packets traversing through the router is stored in fast memory, and in phase 2, the stored flow information is periodically moved to slow memory from the fast memory for further processing (detection and filtering). For attacks which employ the source IP address and the destination IP address spoofing, this embodiment detects the sudden increase in the traffic load of all the expired flows within a short period. In a network without low rate DoS attacks, the traffic load of all the expired flows is less than certain thresholds.

Another embodiment includes a filtering solution to drop the attack packets. The filtering scheme treats the long-lived flows in the Internet preferentially, and drops the attack traffic by monitoring the queue length if the queue length exceeds a threshold percent of the queue limit.

BRIEF DESCRIPTION OF THE DRAWINGS

To assist those of ordinary skill in the relevant art in making and using the subject matter hereof, reference is made to the appended drawings, wherein:

FIG. 3 is an exemplary attack detection procedure.

DETAILED DESCRIPTION

Low rate Denial of Service (DoS) attacks can cause fluctuations in the queue size and congestion levels at the router during the ON period of the attack. The low rate DoS attacks can create an increase in the instantaneous packet loss. The packet losses may be greater than 2%. As such, an exemplary embodiment may have the detection system "off" when there is no attack. For a Reduction of Quality (RoQ) attack, the packet loss might not increase, and so the network administrator can also invoke the detection system by using the congestion signal from an active queue management (AQM) system. In exemplary embodiments, the congestion signal from an adaptive virtual queue (AVQ) algorithm is used to invoke the detection system. Thus, the overhead of performing memory intensive analysis under no attack can be eliminated. A network administrator can tune this parameter.

Figure 1:
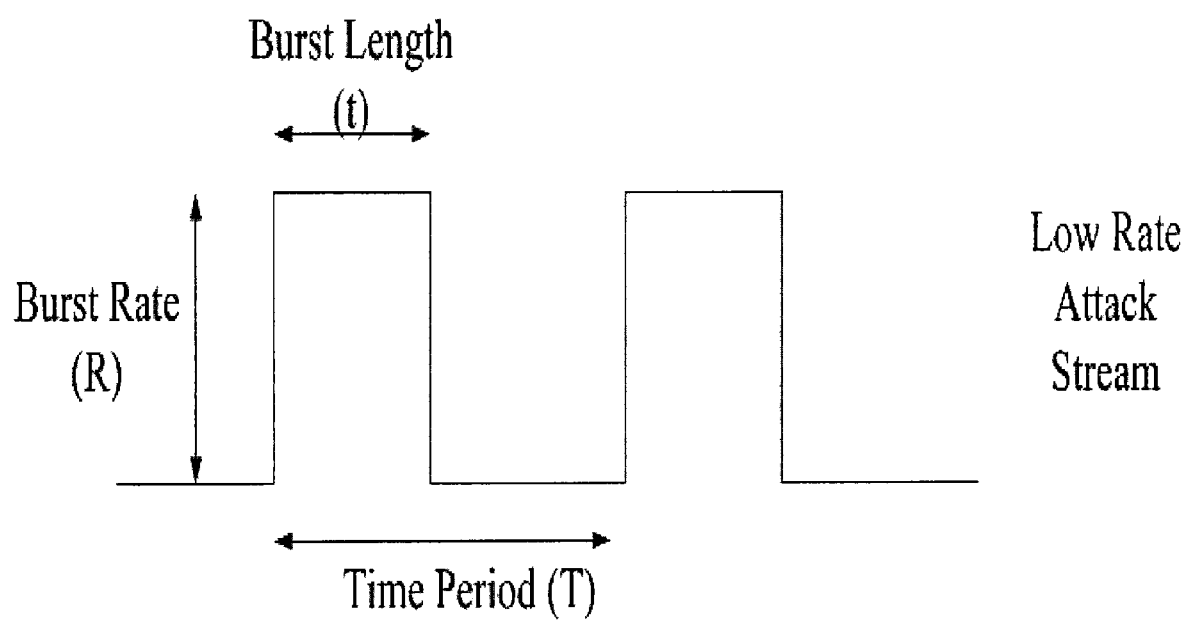
FIG. 1 is a graph showing characteristics of low rate DoS attacks.
Figure 2:
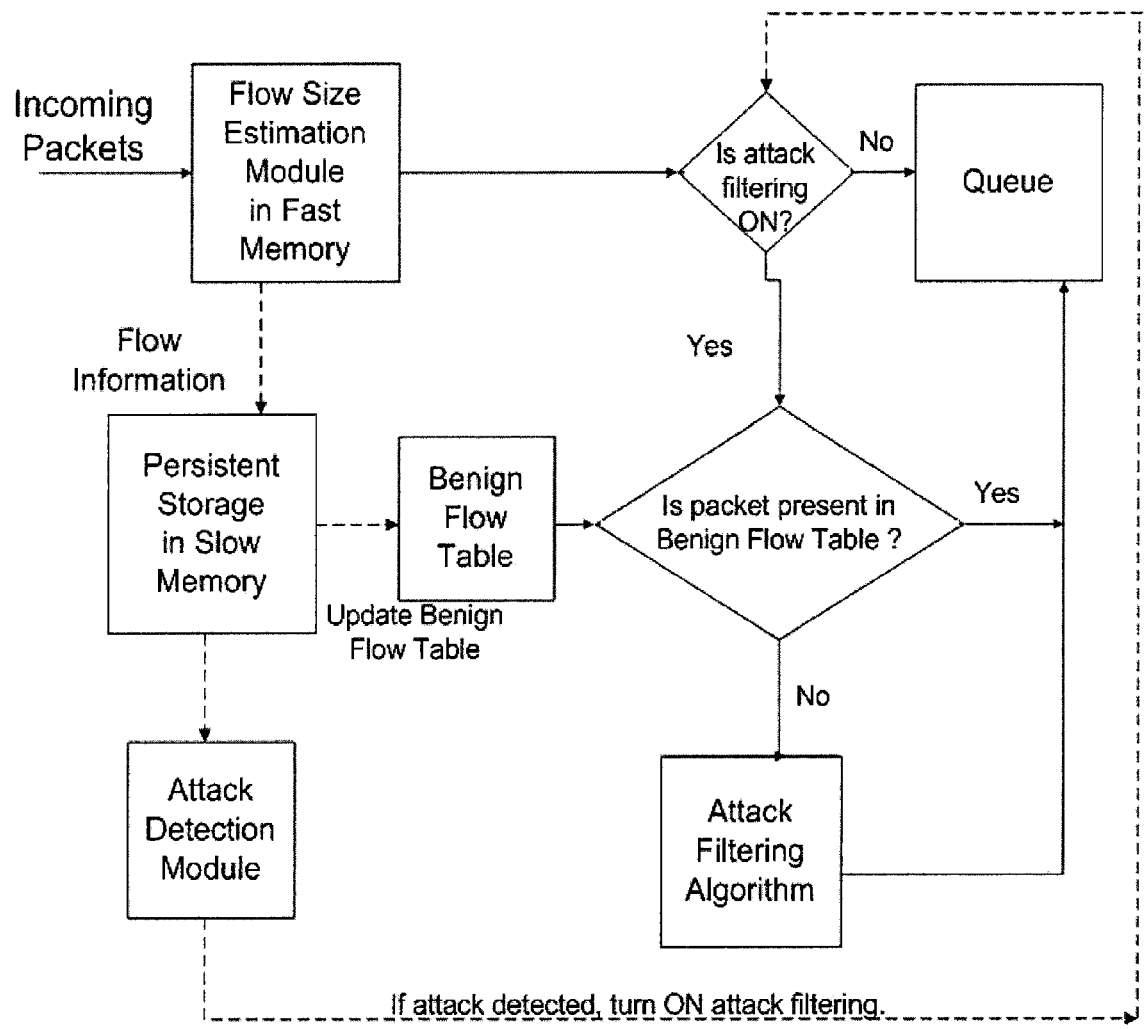
FIG. 2 is a flow diagram depicting a detection system architecture.

The detection system architecture and the attack detection procedures of one embodiment are depicted in FIGS. 2 and 3, respectively. A benign flow table and a flow size estimation table are located in the fast path of the router, and they work at the line rate. The contents of the flow size estimation table are periodically flushed to the persistent storage memory for accurate attack identification. The flow size estimation table keeps track of the flow sizes based on packets passing through the router. If a packet belonging to a new flow arrives, the flow size estimation table is updated. The following fields are maintained for every new flow: the packet count (k), the packet size, the created time and the last accessed time. The last accessed time field indicates when a flow ends. The packet count keeps track of the number of packets of a particular flow. Periodically, the contents of the flow size estimation table are transferred to an off-line storage memory. The benign flow table is used to separate the long-lived flows passing through the router. On the arrival of a new packet, if the attack filtering mode is ON, a query is made to the benign flow table to check whether a flow entry for that packet is present. If the entry exists, the packet is treated normally during the conventional steps of header decoding, route lookup, and forwarding. If the entry does not exist, the packet is passed to the module that implements the attack filtering algorithm. The entries in the benign flow table are updated once the processing performed in the persistent storage memory identifies the new legitimate long-lived flows. The long-lived flows are ones, which are active after at least 2 seconds. A small percentage of the flows contribute to the majority of the bytes and packets of the total traffic passing through a link. Knowledge about the long-lived flows is used to achieve considerable memory savings as well as to provide better throughput for the legitimate flows.

Figures 4, 5:
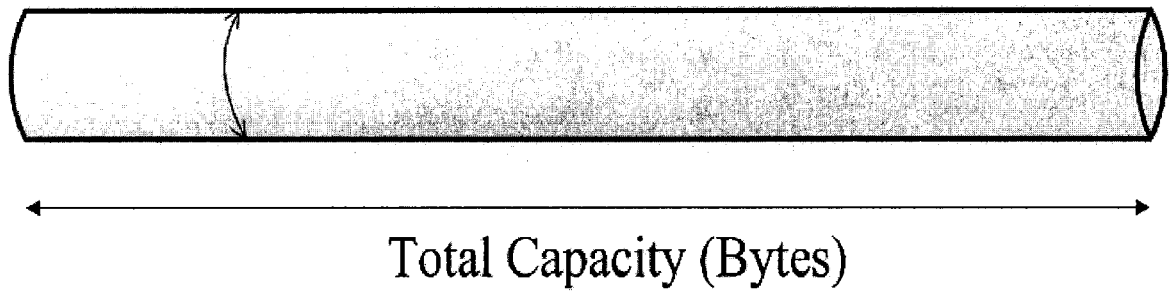
FIG. 4 is an exemplary pseudocode of an attack detection algorithm.
FIG. 5 is a graphical depiction of a communication link in an attack detection algorithm.

One embodiment of the mechanism of the attack detection algorithm can be implemented using the operations depicted with the psuedocode in FIG. 4. Assuming the entire capacity of the link as a big pipe, such as that shown in FIG. 5, the algorithm estimates how much of the pipe is filled by the flows containing at least k packets in a second. Assuming the ON period of the attack to be less than or equal to one second, the algorithm determines if the following holds true:

$$\left( \sum_{All\ Flows\ X<K} Total\ Bytes\ per\ flow \right) >> Threshold$$

The diagram in FIG. 5 shows the capacity and the amount filled by the flows that contain less than or equal to five packets every second. Step 1 of the algorithm of FIG. 4 computes the traffic load of a group of expired flows that satisfy the required criterion in the "if" statement. The expired flows are the ones that do not receive any more packets; it is simply a closed connection between the respective source and destination. Only expired flows are considered in Step 1 of the detection algorithm of FIG. 4. It is advantageous to observe a sudden increase in the traffic load from a group of flows in a short time, and so, the flows formed and expired within a second are considered as seen in Step 1. The createdtime and lastaccesedtime values of individual monitored flows allow precise selection of the flows that were formed and expired within the observation time slice of one second. Step 1 is repeated every one second on all the expired flows stored in the persistent memory. The totalbytecnt (total byte count) of each flow is the sum of the size of each packet in that flow that can be easily derived from the IP header. If the (sum) in Step 2 of the algorithm of FIG. 4 exceeds a threshold, then the detection system invokes the attack filtering module. Thus, an attacker using random IP address spoofing tries to send enough packets, each belonging to a different flow, that are sufficient to fill up the total capacity during the ON period of the attack. The proper selection of the threshold value is important to detect the low rate DoS attack. In one embodiment, three thresholds are used in Step 2 of the detection algorithm of FIG. 4: 1) C+B or greater than C+B, 2) C/2+B or greater than C/2+B but less than C+B, and 3) C/4+B or greater than C/4+B but less than C/2+B. C is the capacity of the link, and B is the buffer size of the router. The proposed algorithm is also good for detecting RoQ attacks which may not try to completely shut down the legitimate traffic by keeping the attack rate low during the ON period.

In at least one embodiment, the detection system can detect an attacker using different IP address spoofing strategies. In this embodiment, the attacker may use perfect random IP address spoofing; that is, a new IP address from the pool of available IP addresses is assigned to every packet. This implies one packet per flow. To detect an attack using continuous cycle IP address spoofing, or variations of random IP address spoofing with more than one packet per flow, the value of the sum variable is checked by keeping k as $0 \leq k \leq C/P$, where k is the number of packets in each flow, C is the capacity of the link, and P is the packet size which can be assumed to be 64 bytes, the size of the smallest packet. A check is made to see if the sum variable is higher than any of the three proposed thresholds in a short period of one second, and whether it repeats periodically. To confirm the proposed heuristics, the range of k as $0 \leq k \leq C/P$ is kept such that in the absence of the low rate DoS attack, the value of the sum variable does not exceed the proposed thresholds. The perfect random IP address spoofing case can be detected by keeping k less than two, and checking if the value of the sum variable is greater than any of the proposed three thresholds. The rationale behind this logic is when the attacker uses random or continuous IP address spoofing, the group of flows or a single flow contribute to the excessive bandwidth usage in a short period of one second. Once the attack is detected, the proposed filtering mechanism is activated in which the attack packets are dropped as they start filling up the capacity. Thus, even if the attacker uses a different IP address in each ON period, the attack packets are dropped.

A. Intelligent Attacker

In at least one embodiment, the only way an attacker can escape the detection system is to enter the benign flow table by sending packets using the attack flowid for more than two seconds, and then using the same flowid to launch a low rate DoS attack. In one embodiment of the detection system, the detection system detects low rate DoS attacks that do not use IP address spoofing to check flows classified as benign to see whether they are instigating an attack. In another possibility, an attacker can subvert a group of machines to get entry into the benign flow table by sending traffic for more than two seconds, and then use these machines to launch a low rate DoS attack using IP addresses of these machines either by using random or continuous IP address spoofing technique.

To detect such an attack, the detection algorithm shown in FIG. 4 is used on the flows classified as benign. It requires adding the total byte count of each flow in the benign flow table for a short period of every one second. As in the detection of the low rate DoS attack described before, the proposed logic of the "SUM" value exceeding predefined thresholds still holds as the attack flows are now part of flows classified as benign. To evade the above change in the detection system, an attacker can use a combination of benign flows and short-lived flows to launch a low rate DoS attack either by using random or continuous IP address spoofing technique. As explained before, an attacker may use a group of subverted machines to gain entry into the benign flow table by sending traffic for more than two seconds, but will likely only use a few of them each time to launch an attack. By distributing machines, the sum variable may not exceed the proposed threshold, when the attack detection algorithm is running separately on separated benign flows and short-lived flows. To detect this variant of a low rate DoS attack, in one embodiment it is proposed to run the attack detection in FIG. 4 on both the benign and short-lived flows simultaneously to see if the sum variable exceeds the proposed thresholds. This process of detecting an intelligent attacker can be activated once the attack-filtering algorithm is activated. In addition, once the attack-filtering algorithm is active, the flow size estimation module keeps track of the flow sizes of flows present in the benign flow table. The approach can thus detect a low rate DoS attack that has any combination of number of flows participating in the attack, any time period, any burst period, and any burst rate.

B. Trace Evaluation

Figure 6:
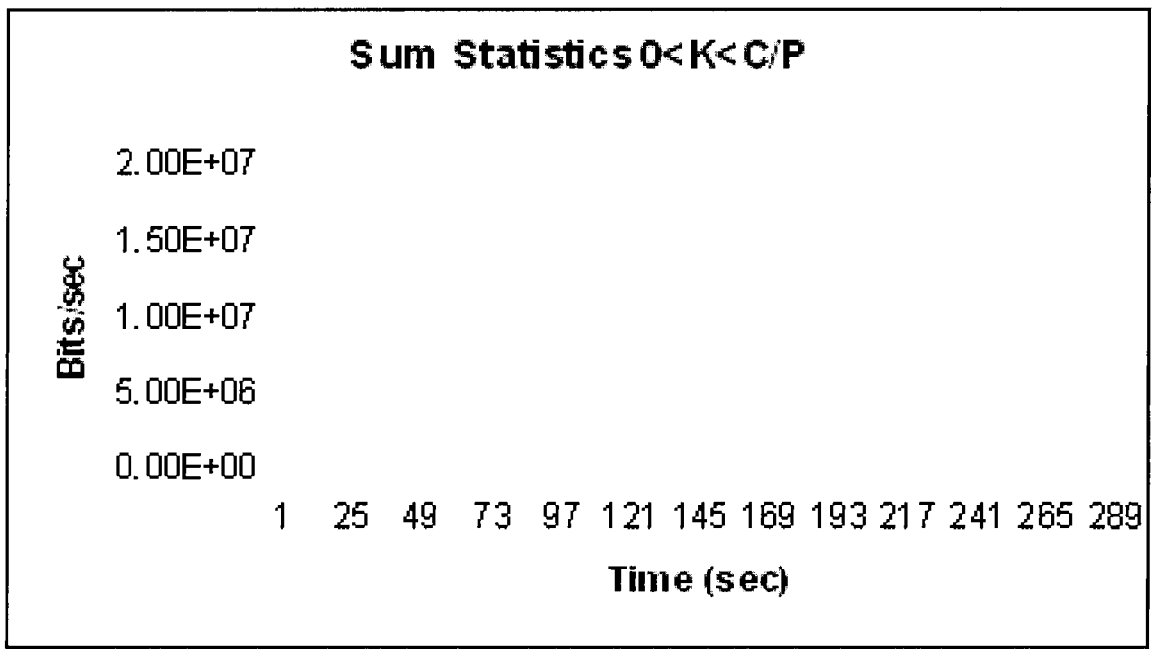
FIG. 6 is a graph of sum statistics for every second in a trace evaluation.
Figure 7:
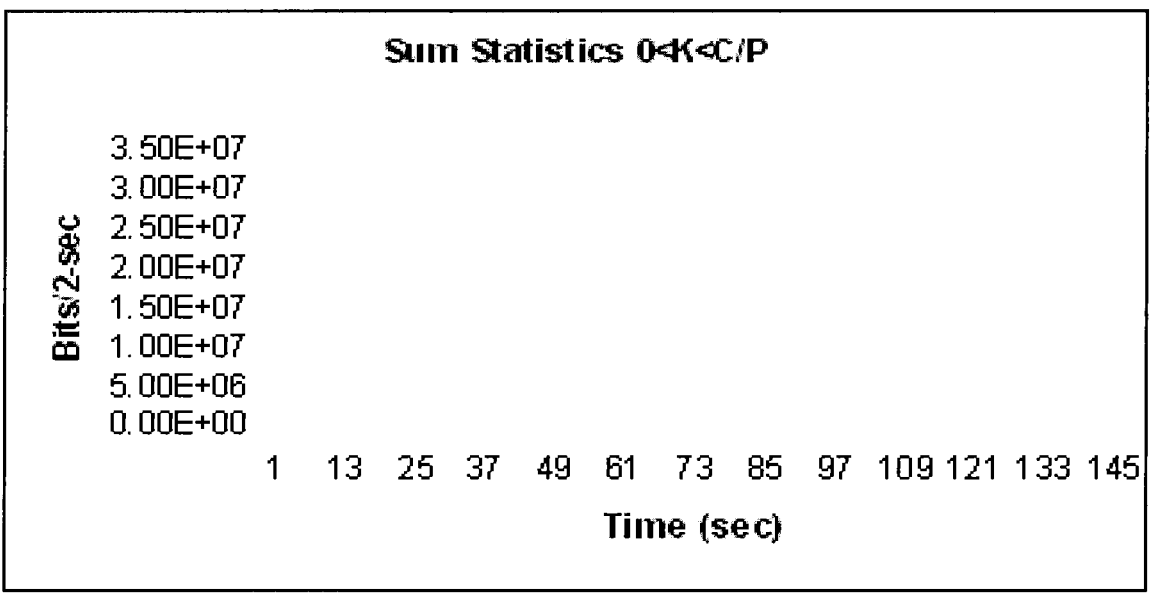
FIG. 7 is a graph of sum statistics for every two seconds in a trace evaluation.

To confirm that the thresholds proposed in the previous subsection work for the Internet traffic, the strategy was evaluated by analyzing the OC48 (2.5 Gbps) traces provided by CAIDA (the Cooperative Association for Internet Data Analysis). In one evaluation, using the Coralreef software, expired flow statistics <Source IP address, Destination IP address, Source IP port, Destination IP port, Packetcnt, Bytecnt, Createdtime, and Lastaccessedtime> were obtained, which are similar to the ones proposed to collect for all the flows. The attack detection algorithm is run using the flow information obtained by the Coralreef software to observe the nature of the sum variable in absence of the low rate DoS attack. FIG. 6 shows the sum variable statistics for a five minute trace. The OC48 speed is 2.5 Gbps, i.e., 2.5E09, and so C/2 is 1.25E09, and C/4 is 62.5E07. FIG. 6 shows that the sum variable does not exceed any of the proposed thresholds. An ON period in a low rate DoS attack is typically less than one second as reported in the literature about low rate DoS attacks. FIG. 7 shows the values of the sum variable for every 2 seconds, in which case an ON period of 2 seconds is assumed. The attack with an ON period greater than 2 seconds can certainly be detected by the approach, but such attacks can be detected by RED-PD and other existing AQM schemes too. It can be argued that the attack cannot be a low rate DoS attack when the ON period is so long. The sum variable in FIG. 7 does not exceed the proposed thresholds. Similar observations were found in other traces. The tuning of lower thresholds below C/2 can be done by studying the sum statistics in the absence of the attack during the normal router operation. One implementation is facilitated by the ease of estimating flow sizes to obtain the sum statistics during the normal router operation. It is of note that in a short period of one to two seconds, the sum variable does not exceed the proposed thresholds in the absence of a low rate DoS attack, as observed in FIGS. 6 and 7. Thus, only during the low rate DoS attack does the sum exceed the proposed thresholds.

C. Filtering Logic

To filter the attack packets which are using the spoofed IP addresses, one embodiment is a nondeterministic approach because it is difficult to know which IP address an attacker will use in future bursts. Thus, it becomes futile to store the attack IP addresses seen in the old bursts. A method has been developed to address this problem. As mentioned before, the long-lived flows in the benign flow table are separated, and they are treated preferentially. On the arrival of packets belonging to these flows, unless the buffer is full, they are enqueued in the queue and are passed normally. Special attention is used while identifying a new benign long-lived flow when the attack-filtering mode is ON by verifying that the difference between createdtime and lastaccessed time should be at least two seconds, and the lastaccessed time is close to the inspection time to classify the flow as a non-expired, legitimate, and long-lived flow. Packets, which belong to the new flows and are not present in the benign flow table, are enqueued in the queue, and the current queue length is then computed. The current queue length is checked if it is greater than $\alpha\%$ of the queue limit. If so, the enqeued packet is dropped immediately; otherwise, the enqeued packet is treated normally. At least one strategy is a preemptive strategy to prevent the attack packets from gaining access to the legitimate bandwidth. It can be empirically confirmed that the point after which the queue length exceeds $\alpha\%$ of the queue limit occurs only during the attack epochs as the legitimate flows will try to share bandwidth, and the attack packets typically try to force the legitimate packets out of the queue once the occurrence of the attack is confirmed by the proposed attack detection algorithm. A tradeoff exists in choosing the percentage of the queue limit for dropping the packets. The percentage selected determines how much attack traffic is dropped as well as the penalty imposed on the legitimate short-lived and long-lived flows. One advantage of this approach is that the number of legitimate short flows traversing the router that needs to be isolated as it is limited. This is advantageous because it is difficult to implement per-flow logic in hardware. The short-lived flows get enough share of the total capacity as just $(100-\alpha)\%$ of the buffer space is denied to them until the low rate DoS attack is filtered. However, some of the packets of the new short flows are dropped, but they are admitted after a few milliseconds when the attack burst has subsided. A normal TCP connection uses the exponential backoff algorithm to resend the dropped packets before giving up. One more advantage from the implementation perspective as compared to the traditional filtering is that no memory is needed to store the list of the IP addresses to be dropped. Simulation results demonstrate the effectiveness of the proposed filtering technique in dropping a significant number of attack packets while simultaneously provisioning the legitimate traffic enough bandwidth. The attack filtering can be stopped after having confirmed the no attack status by using the attack detection algorithm in FIG. 4.

Internet security is vital to facilitate e-commerce transactions, and so research on network traffic monitoring at high speeds is underway. Two important issues with high speed monitoring is the fast memory, i.e., SRAM, is exorbitantly costly, and the cheap memory, i.e., DRAM, is too slow to work at the high speed line rates.

At least one embodiment of flow estimation architecture presented herein uses accurate estimation of the short flows. An estimate of the SRAM requirement in a space code bloom filter is 5 MB per second. One requirement of an exemplary detection system architecture is to obtain the accurate flow sizes of all the flows which traverse a router. This requirement is also achievable by using other technique that can estimate the flow sizes at high speeds. A factor is the time required to update the flow status to the persistent storage memory, which can affect the early detection of the attack. Preferably, the flow size estimation architecture conforms to this constraint. The profile of flow sizes and the sum distributions can be obtained in the absence of the attack scalably by using the above techniques to understand the unique properties of traffic distributions on each link, and to adjust the attack detection thresholds accordingly.

By tuning the sampling probability, the short flows can be estimated scalably by using an array of 32 bit counters without using sophisticated architectures like a space code bloom filter. Uniform packet sampling probability at the router adds more information about the long flows and misses many short flows. At least one embodiment uses this concept in the implementation of previously described embodiments by using two arrays, one for estimating long flows, and other for estimating short flows; output from both is given to the attack detection algorithm and the benign flow table of FIG. 2.

To estimate the size of the benign flow table, commonly used Internet traces are used. An ISP trace for OC48 speed contains 11,341,289 flows. To maintain per-flow states for so many flows can be difficult as the majority of the flows are short-lived leading to continuous updates and removal of flows from the memory. The high-speed memory SRAM which can support such operation can be exorbitantly costly. Now considering the previously described characteristics of the Internet traffic, approximately one-third (3,780,429) flows are used as the large flows. Using a bloom filter calculator to calculate the amount of memory (SRAM) required for maintaining entry of each flow in a bloom filter for approximately 3,780,429 flows with the probability of false positive of 0.001, and four hash functions, the required size of the bloom filter is 2 MB. Note that these are not live flows at one instant, but the total number of flows found in the entire trace. The maximum number of live flows is 714,166 in another OC-48 trace for which the size of the bloom filter is 1.8 MB using the same parameters as before. Thus, the benign flow table has a modest memory requirement of about 2 MB.

Figure 8:
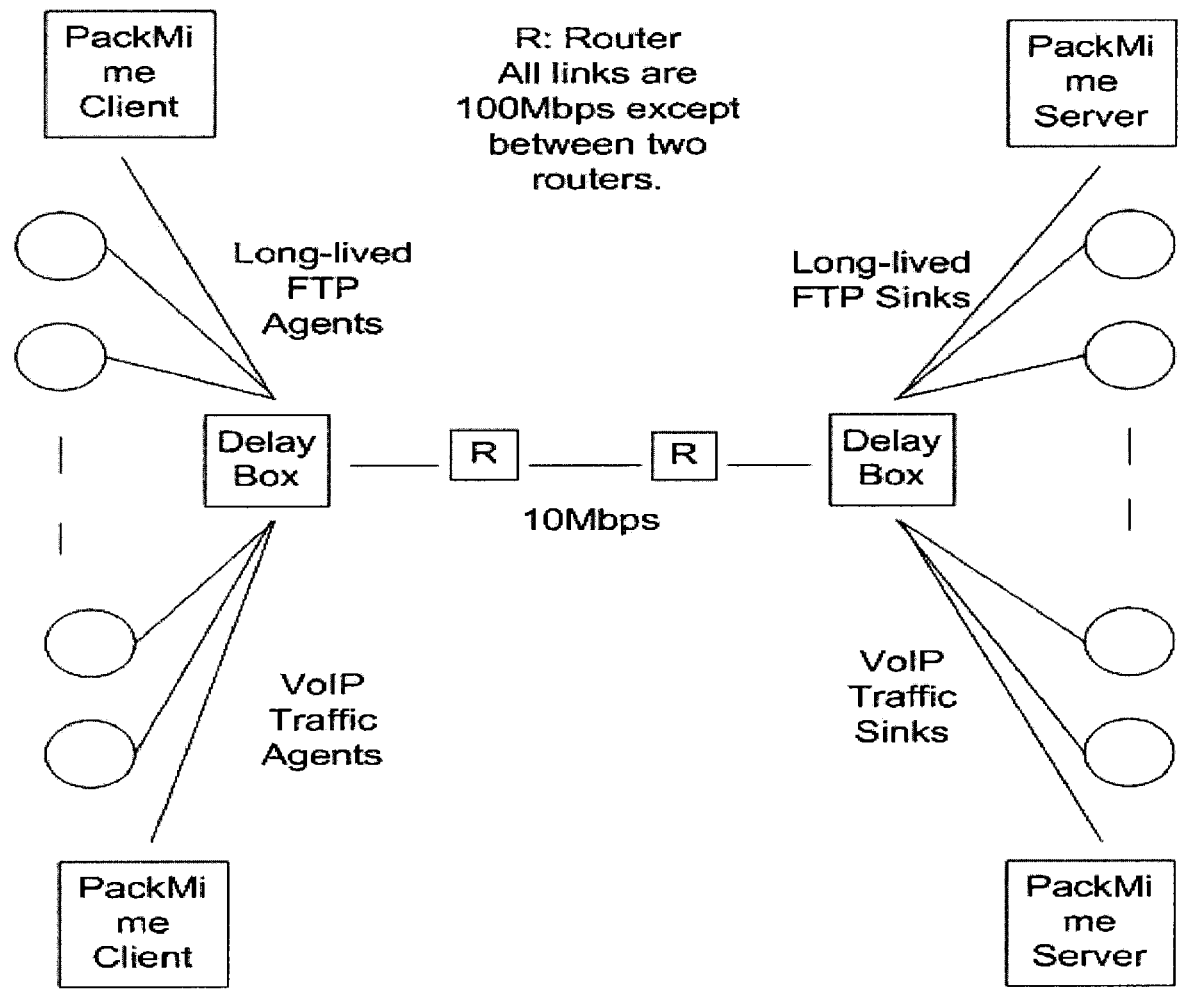
FIG. 8 is a simulation topology for an exemplary attack detection algorithm.

An ns2 simulator was used to demonstrate the performance of the proposed detection scheme of one embodiment. The topology used in the example experiment is shown in FIG. 8.

The packmime HTTP traffic generator was used with real traces of the Internet traffic. The topology consists of two PackMime clients, two PackMime servers connected by 100 Mbps links to the delaybox, and two routers with a buffer size of 1000 packets each and a bottleneck link of 10 Mbps between them. The link between the delaybox and the router is 100 Mbps. The delaybox is used to provide per flow dropping probability, round-trip times, and bottleneck link speeds. In this setting, the dropping probability is zero and the server bandwidth is based on uniform random variable from 1 to 20 Mbps. All the access links have random delays obtained by using an uniform distribution from 50-250 ms. The access links connecting to the sink agents and the bottleneck link has link delay of 10 ms. There are ten long-lived flows using FTP in the network. The details of the SACK TCP used in the simulations are: window size 43 packets, segment size 1460, minimum RTO one second for the FTP flows, and the rest of the parameters are the default settings. The full-TCP of the packmime model also uses the SACK TCP; other details are the same as that of the TCP used for FTP. Five VoIP flows are modeled as G711 64 Kbps traffic using the exponential on-off traffic model in ns2. The attacker uses UDP constant bit rate traffic (CBR). An exemplary detection system code can be embedded in the AVQ algorithm of ns2, and the detection system is invoked when the virtual capacity exceeds the AVQ-defined threshold.

The simulation ran for 650 seconds with a warm up time of 50 seconds; the attack was introduced 50 seconds later after the start of the simulation. The packmime connection rate was 15 connections per second, i.e., 15 new HTTP connections would start every second. About 8000 connections were generated during the lifetime of the simulation. The detection system code uses the flow id field available in ns2 to implement the per-flow logic. The flow-id can be replaced by the hash of the source IP address, the destination IP address, the source port, and the destination port.

Figure 9:
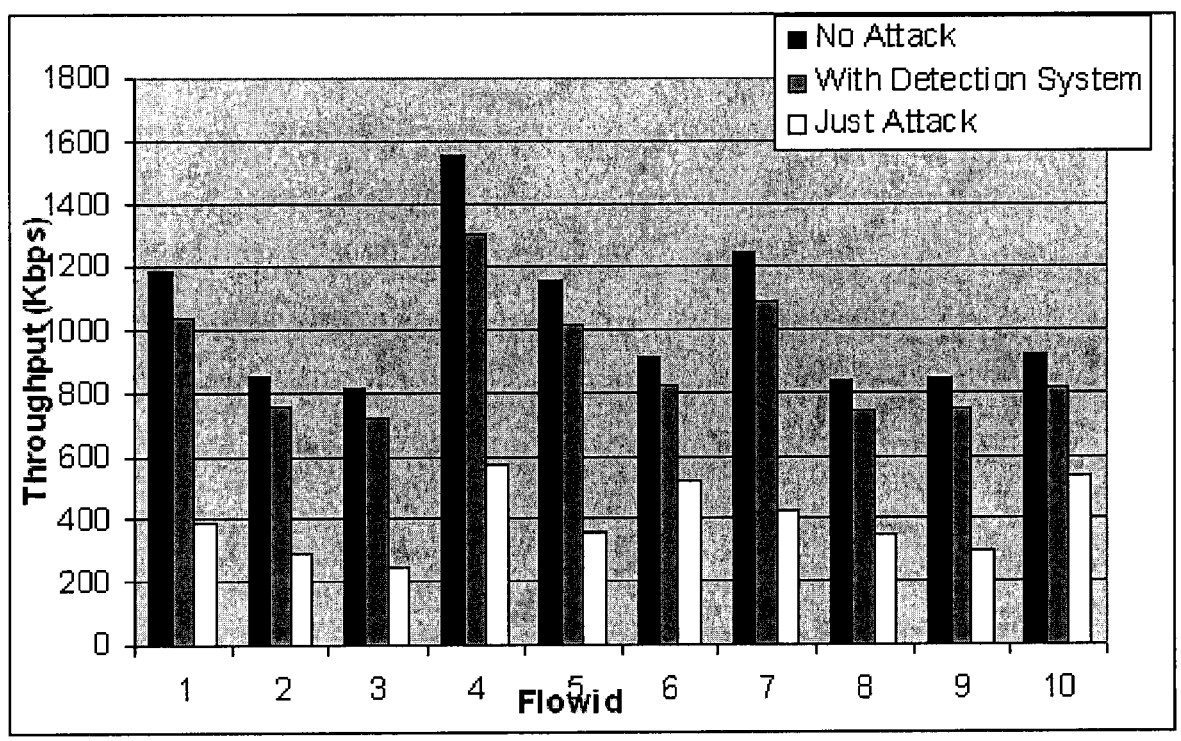
FIG. 9 is a graph showing a throughput comparison under a low rate DoS attack.

In the results, the attacker uses random IP address spoofing with the time period of 1 second, the burst period of 0.3 second, and the burst rate of 15 Mbps. This embodiment of the detection system detects the low rate DoS attack as explained in the attack detection algorithm. FIG. 9 shows that the throughput of the FTP flows using the exemplary detection system at the router is comparable to the case with no attack. The throughput of FTP flows under the attack without the detection system is low.

Figure 10:
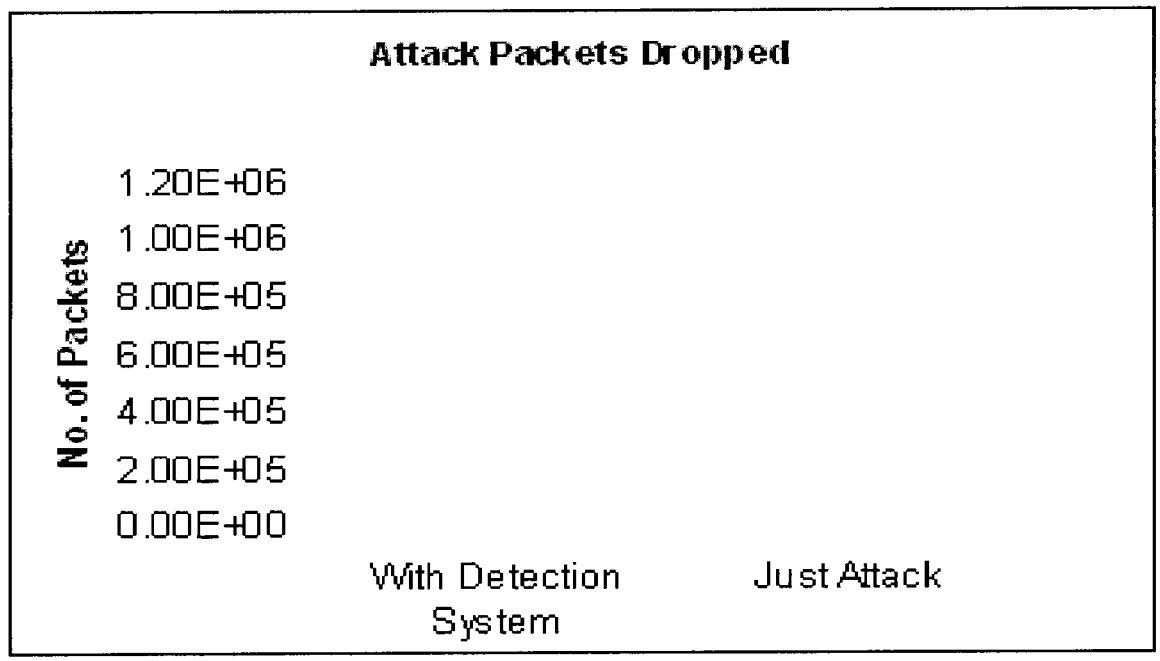
FIG. 10 is a graph showing attack packets dropped under a low rate DoS attack.

The number of attack packets dropped by using the detection system is shown in FIG. 10. Roughly, $10^6$ attack packets were dropped by the detection system as compared to $2\times10^5$ packets dropped without using the detection system. The packet loss counts in all results are calculated for the duration of the simulation. The value of $\alpha$ was set to be 30% because higher values lead to loss of throughput to the legitimate long-lived flows in the benign flow table as more attack packets occupy the buffer space.

Figure 11:
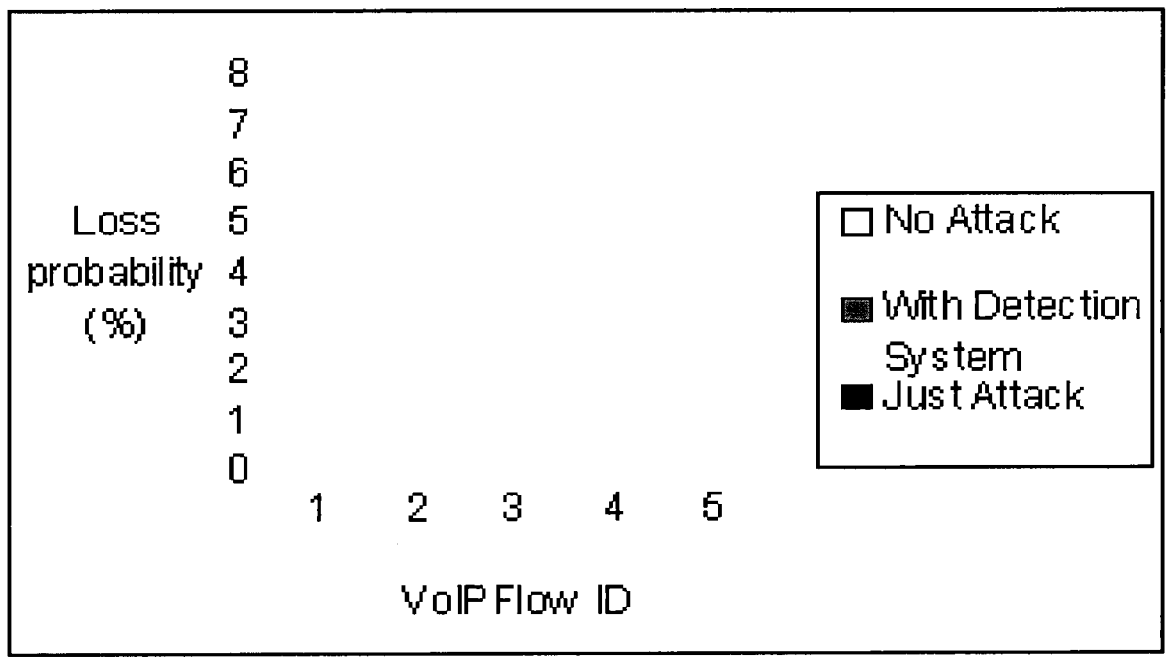
FIG. 11 is a graph showing a VoIP packet loss comparison under a low rate DoS attack.
Figure 12:
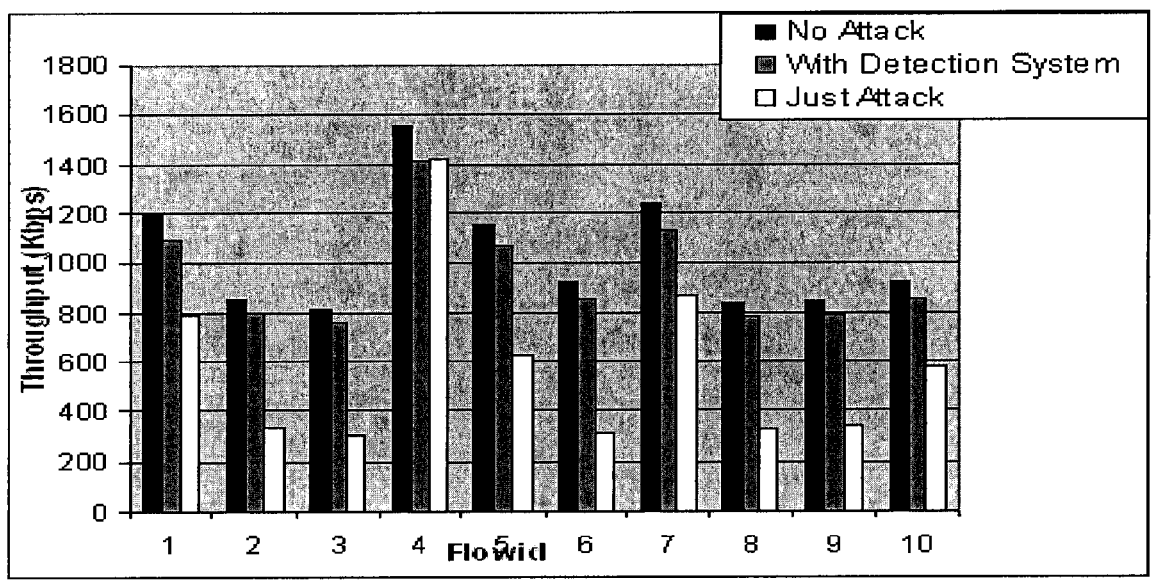
FIG. 12 is a graph showing throughput comparison under RoQ attack.
Figure 13:
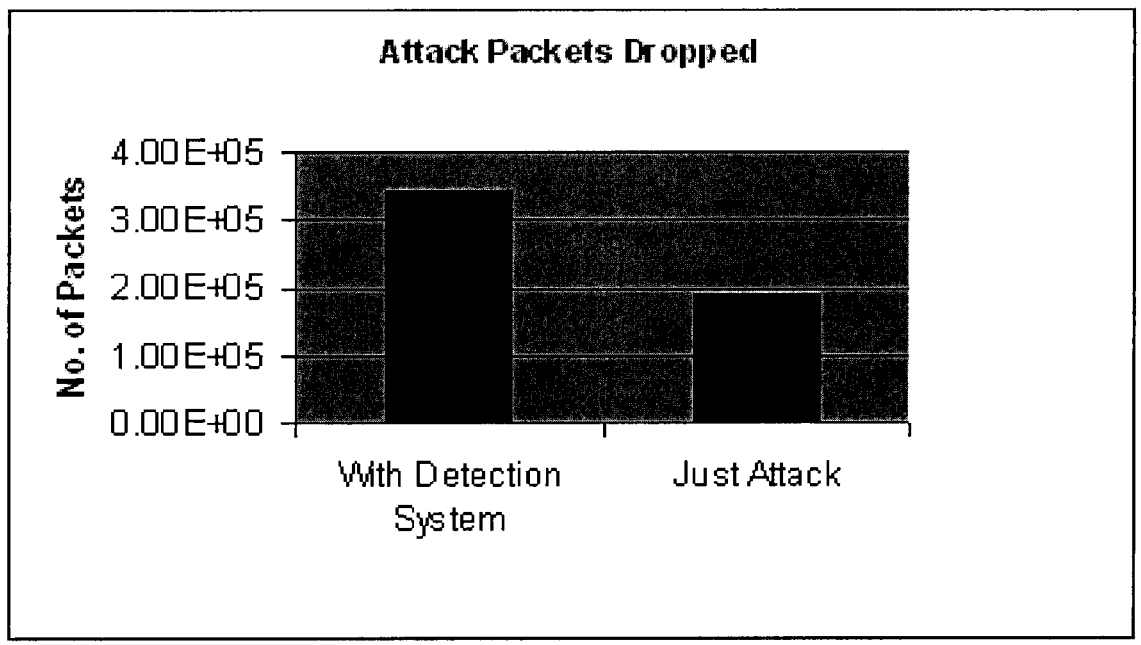
FIG. 13 is a graph showing attack packets dropped under an RoQ attack.

FIG. 11 shows that using the detection system, the VoIP flows experience no packet loss. The VoIP flow is classified as a benign long-lived flow as it is active for more than two seconds. A RoQ attack is used with the time period of seven second, the burst period of 0.6 second, and the burst rate of 15 Mbps. The attacker uses random IP address spoofing as described earlier. FIG. 12 shows that the throughput for the long-lived flows is restored to that of the case with no attack. As expected, the throughput decrease in the case of the RoQ attack is not as high as that in the low rate DoS attack. The number of attack packets dropped during the whole simulation is higher as expected as shown in FIG. 13.

Figure 14:
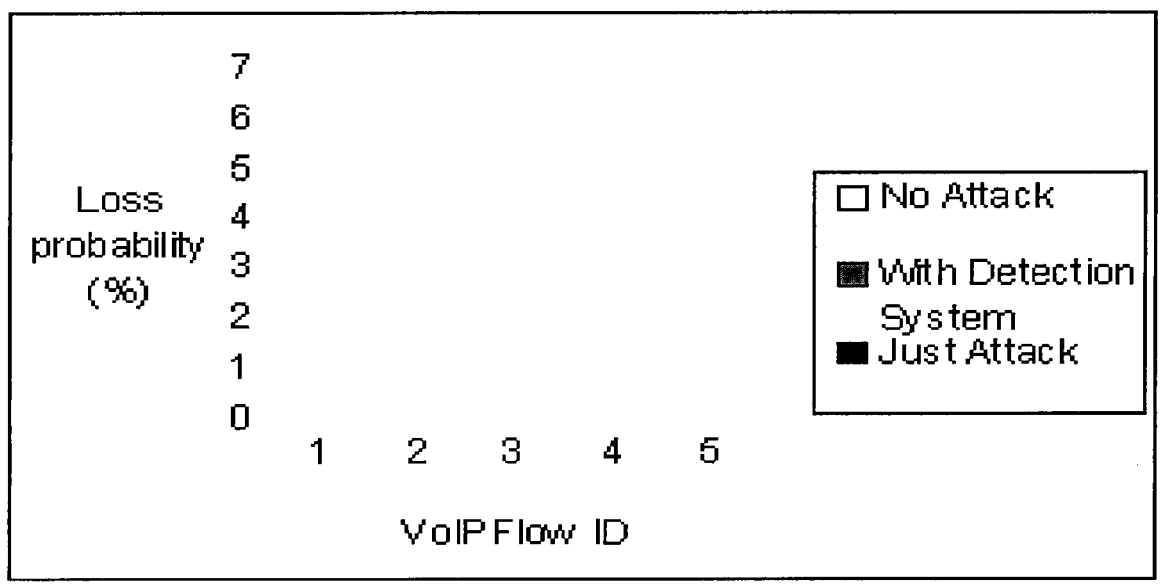
FIG. 14 is a graph showing a VoIP packet loss comparison under RoQ attack.
Figure 15:
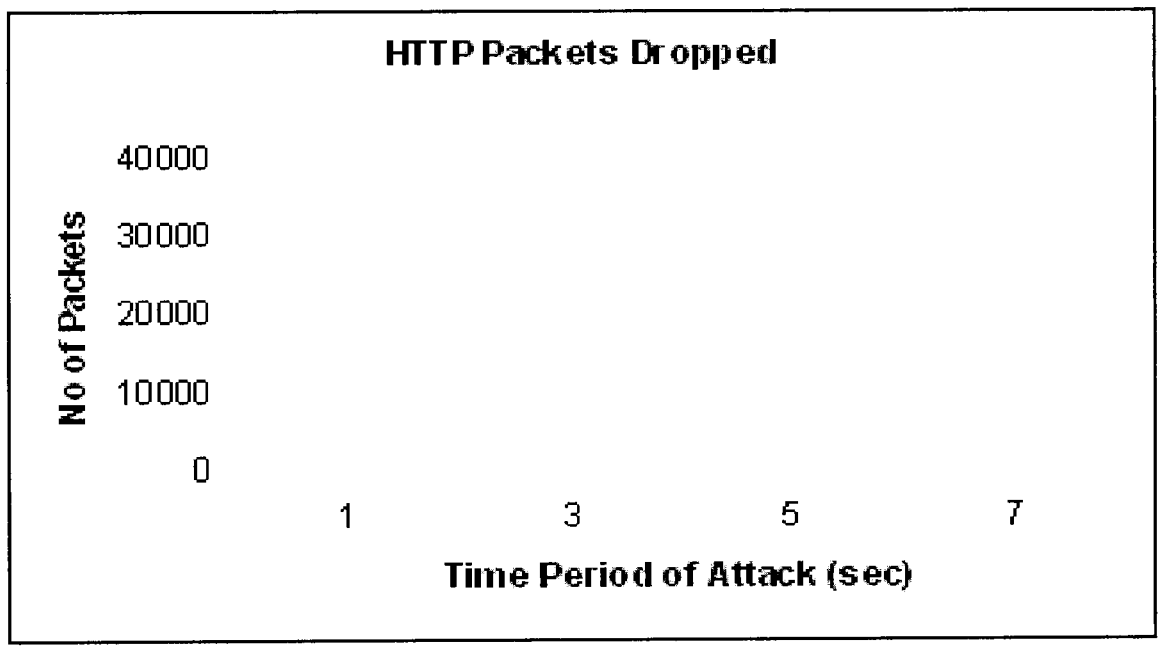
FIG. 15 is a graph showing the effect of attack periods on HTTP packet loss.

In FIG. 14, VoIP flow does not experience any packet loss with the use of the detection system. For the RoQ attack with the time-period of seven seconds, the value of $\alpha 60$ was kept because higher values lead to loss of throughput to the monitored legitimate flows in the benign flow table. The value of $\alpha$ is higher for the RoQ attack filtering as compared to that of the low rate DoS attack with the time period of one second as the attack packets enter the network less frequently. FIG. 15 shows the effect of increasing the time period of the attack from one to seven seconds on the legitimate HTTP traffics packet loss. FIG. 15 represents aggregate packet loss for about 8000 HTTP connections. The aggregate HTTP packet loss due to the detection system is tolerable for attack time periods greater than three seconds. In a low rate DoS attack with the time period of one second and the burst period of 0.5 second, attack packets are constantly enqueuing to the queue. The filtering algorithm, which checks for the queue length while dropping a packet of the unmonitored flows, is always above the $\alpha$% of the queue limit, and so to stop the attack traffic the legitimate short-lived traffic is compromised.

Figure 16:
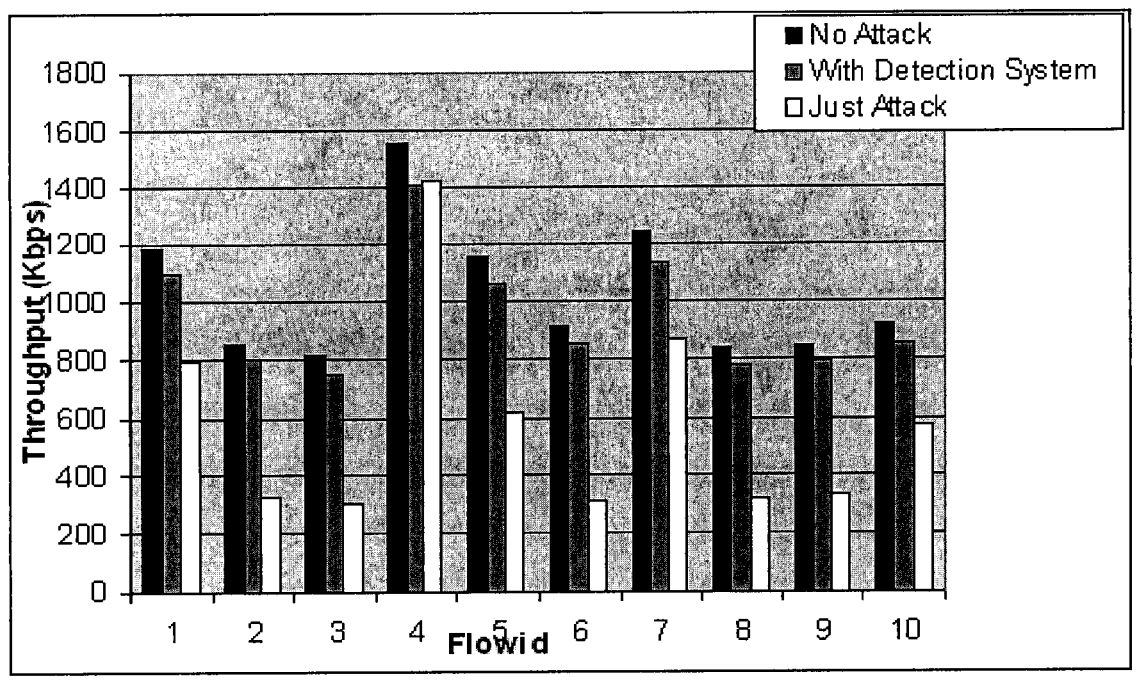
FIG. 16 is a graph showing the throughput comparison under RoQ attack with continuous cycle IP address spoofing.
Figure 17:
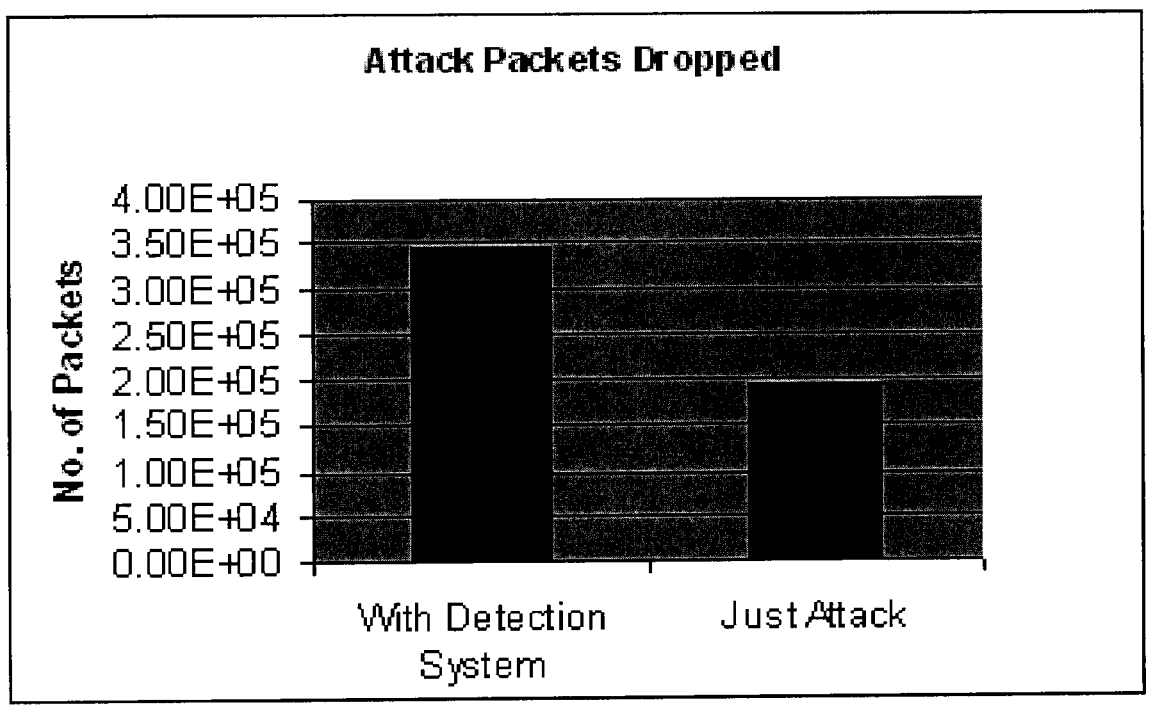
FIG. 17 is a graph showing attack packets dropped under RoQ attack with continuous cycle IP address spoofing.

Experiments were also performed where an attacker uses a continuous cycle IP address spoofing in which a new IP address is used for every ON period. In the simulation, an attacker sends approximately 500, 5K, 10K, 15K, and 20K packets, each of size 210 bytes, to fill up the bottleneck link during the ON period of 10 ms, 110 ms, 210 ms, 310 ms, and 410 ms, respectively. The ON periods chosen above are the cases where RED-PD fails to detect an attacker using a continuous cycle IP address spoofing. The attacker in this scenario sends 4K packets with a new IP address every ON period. The results for this scenario are shown in FIGS. 16 and 17. The throughput of the legitimate long-lived flows is restored, and a significant number of attack packets are dropped using the proposed detection system.

There is loss to the short-lived traffic during the attack bursts while filtering the low rate DoS attacks that have small time period as evident from FIG. 15. One way to prevent this loss is keeping the per-flow states of the legitimate short-lived flows by developing intelligent algorithms that can be realized in the hardware. The per-flow states can be maintained in the benign flow table for the flows in some flow ranges by splitting the entire 0 to C/P k-range such that the sum variable for the individual k range in FIG. 3 does not exceed the proposed thresholds. Thus, the attack-filtering algorithm drops the packets belonging only to the flow range that contains attack packets, and the short-lived flows in the rest of the ranges are not penalized. From the attacker's perspective, an RoQ attack is more useful as the average attack rate is low allowing less exposure, and using the exemplary detection system the HTTP packet loss is tolerable while detecting the RoQ attack.

The exemplary architecture facilitates identification and filtering of the attack traffic in which IP address spoofing is used. The approach thus addresses most of the issues where RED-PD and several other approaches fail to defend against these attacks.

At least one exemplary embodiment is a scalable approach to detect the stealthy low rate DoS attacks which use IP address spoofing. The exemplary embodiments address the IP address spoofing problem in the context of the low rate DoS attacks, and proposes an effective and realizable solution to defend against these attacks. The effectiveness of the exemplary embodiments has been demonstrated via extensive experiments. In the prior art, there is no effective solution to defend low rate DoS attacks that employ IP address spoofing. The exemplary embodiments described herein provide a solution to defending low rate DoS attacks that employ IP address spoofing in the network security area.

The applicant has attempted to disclose all embodiments and applications of the disclosed subject matter that could be reasonably foreseen. However, there may be unforeseeable, insubstantial modifications that remain as equivalents. While the exemplary embodiments have been described in conjunction with specific, exemplary embodiments thereof, it is evident that many alterations, modifications, and variations will be apparent to those skilled in the art in light of the foregoing description without departing from the spirit or scope of the present disclosure.

What is claimed is:

1. A method of providing low rate Denial of Service (DoS) attack detection and mitigation, the method comprising:
   receiving an incoming packet at a router;
   updating a flow size estimation table in response to receipt of the incoming packets;
   determining, using a processor, if a flow in the flow size estimation table is expired, wherein an expired flows has not received incoming packets for a period of time;
   in response to determining the expired flow, computing a flow traffic load;
   determining if the received incoming packet corresponds to a new flow; and
   if the received incoming packet corresponds to a new flow and the flow traffic load is above a predetermined threshold, computing length of a current queue and if the length is greater than a percent threshold of a queue limit, the received incoming packet is dropped, wherein a new flow is determined by checking a benign flow table for a flow entry corresponding to the received incoming packet.

2. The method of claim 1, wherein the benign flow table is checked only when an attack filtering mode is on.

3. The method of claim 1, further comprising:
   determining a traffic load of benign flows within a predetermined time period based upon the flow size estimation table;
   if the received incoming packet corresponds to a benign flow and the traffic load of benign flows is above a second predetermined threshold dropping the received incoming packet.

4. The method of claim 1, wherein the flow size estimation table includes fields for packet count, packet size, created time, and last accessed time.

5. The method of claim 1, further comprising periodically moving contents of the flow size estimation table from a first memory to a second memory.

6. The method of claim 5, wherein the second memory is persistent storage.

7. The method of claim 6, further comprising updating existing flows and adding new flows to the persistent storage.

8. The method of claim 1, further comprising detecting when a virtual queue of packets at the router exceeds a threshold, wherein the virtual queue corresponds to the current queue.

9. The method of claim 8, wherein the threshold is obtained using an adaptive queue management algorithm.

10. A system for providing low rate Denial of Service (DoS) attack detection and mitigation, the system comprising:
    a communication interface configured to receive an incoming packet at a router;
    a processor configured to:
       update a flow size estimation table in response to receipt of the incoming packets;
       determine if flow in the flow size estimation table is expired, wherein an expired flow has not received incoming packets for a period of time;
       in response to determining the expired flow, compute a flow traffic load for the expired flow;
       determining if the received incoming packet corresponds to a new flow; and
       if the received incoming packet corresponds to a new flow and the flow traffic load is above a predetermined threshold, compute length of a current queue and if the length is greater than a percent threshold of a queue limit, the received incoming packet is dropped, wherein a new flow is determined by checking a benign flow table for a flow entry corresponding to the received incoming packet.

11. The system of claim 10, wherein if an attack filtering mode is on, the processor is configured to check the benign flow table and, if the incoming packet has a corresponding flow entry in the benign flow table, the incoming packet is sent to the current queue.

12. The system of claim 11, wherein if the attack filtering mode is off, the processor is configured to send the incoming packet to the current queue.

13. The system of claim 10, wherein the processor is further configured to:
- determine a traffic load of benign flows for a predetermined period based upon the flow size estimation table;
- if the received incoming packet corresponds to a benign flow and the traffic load of benign flows is above a second predetermined threshold dropping the received incoming packet.

14. A non-transitory computer-readable medium having instructions stored thereon comprising:
- instructions to receive an incoming packet;
- instructions to update a flow size estimation table in response to the receipt of the incoming packets;
- instructions to determine if a flow in the flow size estimation table is expired, wherein an expired flow has not received incoming packets for a period of time;
- instructions to compute a flow traffic load for the expired flow in response to determining the expired flow;
- instructions to determine-if the received incoming packet corresponds to a new flow, wherein a new flow is determined by checking a benign flow table for a flow entry corresponding to the received incoming packet; and
- instructions to compute a length of a current queue if the received incoming packet corresponds to a new flow, and, if the flow traffic load is above a predetermined threshold and the length is greater than a percent threshold of a queue limit, the incoming packet is dropped.

15. The non-transitory computer-readable medium of claim 14, further comprising instructions to check the benign flow table if an attack filtering mode is on and, if the incoming packet has a corresponding flow entry in the benign flow table, the incoming packet is sent to the current queue.

16. The non-transitory computer-readable medium of claim 14, further comprising instructions to send the incoming packet to the current queue if the attack filtering mode is off.

17. The non-transitory computer-readable medium of claim 14, wherein the flow size estimation table includes fields for packet count, packet size, created time, and last accessed time.

18. The non-transitory computer-readable medium of claim 14, further comprising instructions to move contents of the flow size estimation table from a first memory to a second memory.

* * * * *